Figure 1:
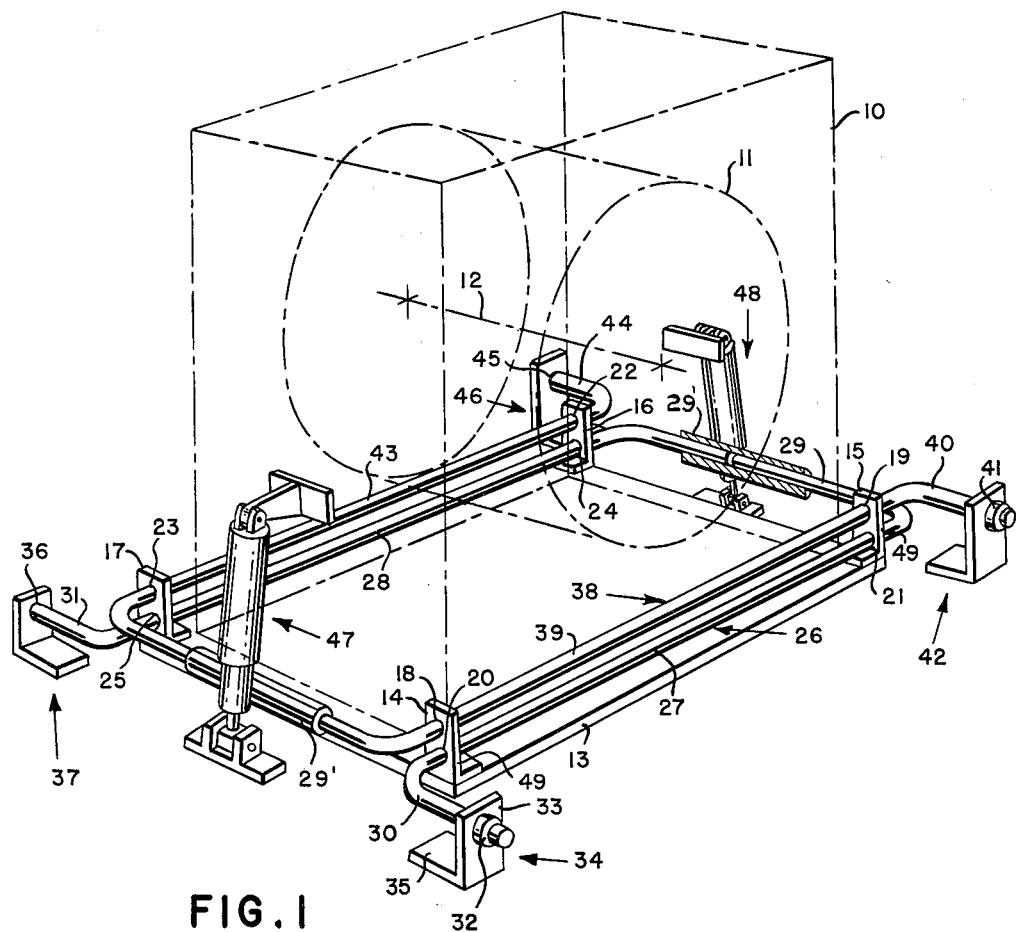

May 21, 1963     R. F. SCHWEGLER ET AL     3,090,586
MACHINE MOUNTING
Filed Jan. 4, 1961

INVENTORS
ROY F. SCHWEGLER
BY KENNETH H. WOLVERTON
Robertson & Smythe
ATTORNEYS

United States Patent Office 3,090,586
Patented May 21, 1963

3,090,586
MACHINE MOUNTING
Roy F. Schwegler, Davenport, Iowa, and Kenneth H. Wolverton, Moline, Ill., assignors to Ametek, Inc., New York, N.Y., a corporation of Delaware
Filed Jan. 4, 1961, Ser. No. 80,639
9 Claims. (Cl. 248—20)

The present invention relates to vibration isolation mountings for machines normally subjected to vibrations due to unbalanced loads being rotated, such as washer extractors and the like.

In washer extractor machines and the like, vibrations due to unbalanced loads, stopping and reversing seriously affect the supporting structure to which such machines are fastened. There are three types of induced vibration in the plane of rotation of the unbalanced load, namely, vertical, horizontal and torsional.

The principal object of this invention is to provide a mounting for machines normally subjected to vibrations due to the rotation of unbalanced loads, which mounting will isolate from the supporting floor the major portion of forces incident to such vibrations.

Another object of the invention is to provide such a mounting that will lessen the transmitted forces due to reversals and stopping of such machines.

Still another object of the invention is to provide such a mounting that is elastic and has a natural period of vibration well below the normal operating speed of the machine being supported.

A still further object of the invention is to provide such a mounting which is of simple and inexpensive construction.

Still another object of the invention is to provide such a mounting augmented by shock-absorbing means capable of damping all three modes of vibration, namely, vertical, horizontal and torsional.

In one aspect of the invention, a machine of the washer extractor type may be rigidly fixed to a platform, at each of the four corners of which may be located an angle member arranged with a free leg extending vertically upwardly from the platform. The angle members on each of two sides of the platform may face each other and may be provided with vertically spaced, aligned holes.

In another aspect of the invention, a torsion bar support may be provided for the platform. It may comprise two U-shaped torsion bar arrangements at the free ends of the legs thereof having right angular extensions. One of the torsion bar arrangements may pass through one set of aligned holes in the angle members on the platform and surround three sides of the washer extractor, with the right angular extensions at the free ends of the legs passing through holes within other angle members rigidly fixed to the floor supporting the extractor.

In another aspect of the invention, the other U-shaped torsion bar arrangement may pass through the other set of vertically spaced, aligned holes in the angle members on the platform and also surround three sides of the extractor, but reversely relative to the first-mentioned torsion bar arrangement, so that all four sides of the extractor are surrounded by torsion bars. The right angular extensions of the second U-shaped arrangement may pass through holes within other angle members that are fixed to the supporting floor at the end of the extractor opposite that where the first-mentioned floor angle members are located.

In still another aspect of the invention, shock absorbers may be attached to the extractor and floor on opposite sides of the axis of rotation of the extractor basket for lessening the shock incident to reversals and stopping of the rotary basket of the extractor with unbalanced loads therein.

In still another aspect of the invention, shock-absorbing means which preferably are double-acting may be arranged at each of the four corners of the suspended platform, and they may be arranged in such a manner to damp all three modes of vibration, namely, vertical, horizontal and torsional, that are induced in the plane of rotation of an unbalanced load.

The above, other objects and advantages of the invention will become apparent from the following specification and accompanying drawing which is merely exemplary.

Figure 2:
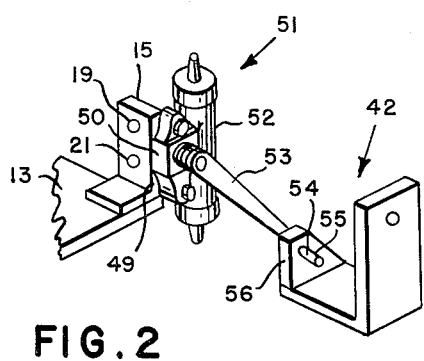

In the drawing:

FIG. 1 is a perspective view of a washer extractor to which the principles of the invention have been applied; and FIG. 2 is a perspective view of a detail of a modified form of shock absorber and mounting.

Referring to the drawing, the principles of the invention are shown as applied to a mounting for a washer extractor including a housing 10 within which a basket 11 is mounted for rotation about a horizontal axis 12. The housing 10 may be rigidly fixed to a platform 13. Angle members 14, 15, 16 and 17 may be fixed to the four corners, respectively, of the platform 13. The vertical, upstanding legs of angle members 14 and 15 may face each other, and they may be provided with holes 18, 19, 20 and 21. The holes 18, 19 may be aligned with each other, and holes 20, 21 may be aligned with each other.

The vertical, upstanding legs of angle members 16 and 17 may face each other and they may be provided with holes 22, 23, 24 and 25. The holes 22, 23 may be aligned with each other and at the same elevation as holes 18 and 19. Holes 24 and 25 may be aligned with each other and at the same elevation as holes 20, 21.

A generally U-shaped torsion bar assembly 26 may have parallel legs 27, 28 coupled by a coupling member 29. Right angle extensions 30 and 31 may be provided at the free ends of legs 27 and 28, respectively. The leg 27 may pass through aligned holes 20 and 21 in angle members 14 and 15, and the extension 30 may pass through a hole within a leg 33 of an angle member 34, the other leg 35 of which may be bolted to the supporting floor. The leg 28 of bar member 26 may pass through aligned holes 24 and 25 in angle members 16 and 17, and the extension 31 may pass through a hole 36 in an angle member 37 similar to member 34 and which also may be bolted to the supporting floor. Collar 32 may be provided on extension 30. Assembly 26 may be a single piece.

Another torsion bar assembly 38, identical with assembly bar 26, may be arranged in reverse fashion relative to bar 26. It may include a leg 39 that passes through aligned holes 18 and 19 in angle members 14 and 15. A right angle extension 40 on the free end of leg 39 may pass through a hole in an angle bracket 42 that may be bolted to the floor. A leg 43 of the bar 38 may pass through aligned holes 22 and 23 in angle members 16 and 17, and an extension 44 may pass through a hole 45 in an angle member 46 identical to member 34, and it may also be bolted to the supporting floor. Coupling member 29' may couple the ends of legs 39 and 43. Collar 41 may be fastened to extension 40. It should be evident that assembly 38 may be a single piece.

Shock absorbers 47 and 48 may be mounted between the housing 10 and the supporting floor on opposite sides of the axis of rotation of the basket 11 for absorbing severe vibrations incident to stopping and reversing unbalanced loads within the basket 11.

From the foregoing it is evident that an elastic suspension has been provided for a machine including a rotatable unbalanced load. To better visualize the action of the mounting, consider the housing as being fixed in space and that the angle members 34, 42, 37 and 46 are vibrating vertically. It is evident that the legs 27, 39, 28 and 43 are subjected to torsional vibrations which act on the bars 29 and 29', subjecting their top and bottom fibers to alternate tensile and compressive stresses.

The arrangement of the torsion bars 26 and 38 is such that the natural frequency of vibration of the mounting is of a relatively low order compared with the normal speeds of rotation of the basket 11. So long as this relationship exists, the forces incident to vibrations of the housing 10 occasioned by the rotation of basket 11 with an unbalanced load at extracting speeds will be largely isolated from the supporting floor. For example, with a machine having an intermediate speed of rotation of 180 r.p.m. and a high speed of 550 r.p.m., it was found that employing the above described suspension having a natural frequency of about 124 cycles per minute isolated the major vibration forces from the supporting floor, and that at the speed of rotation corresponding to 124 cycles per minute period, the unbalance forces are normally small.

Referring to FIG. 2, each of the angle members 14, 15, 16 and 17 may have fixed to one of its vertically extending edges 49, the housing 50 of a double-acting shock absorber 51. The shock absorber 51 may be of conventional design including a hydraulic cylinder 52 within which a piston is adapted to reciprocate in a restricting manner by the oscillation of an arm 53. The arm 53 may be arranged at substantially a 45° angle with the horizontal, and substantially radial relative to the axis 12 of rotation of the basket 11. The free end of arm 53 may include a cam follower lever 54 at right angles to arm 53, and it may ride within a slot 55 formed in a vertical wall 56 integral with the angle bracket or supporting means 42. The slot 55 may be at substantially a 45° angle with the horizontal. By so arranging the arm 53 and slot 55, components of all three vibrations, namely, vertical, horizontal and torsional, within the plane of rotation of an unbalanced load within basket 11 will be damped.

When washer extractors are operated in the extracting cycle with off-balance loads, the vibrations become excessive and prior practice has required use of heavy foundations extending to solid ground. By use of the principles of the present invention, it has been found possible to mount large washer extractors on second or upper floors of buildings without special foundations. It also has been found that the machine movement permitted by the mounting arrangement described herein assists in shaking the clothes free from the interior of the drum as the machine slows down.

Although the various features of the elastic mounting have been shown and described in detail to fully disclose one embodiment of the invention, it will be evident that changes may be made in such details and certain features may be used without others without departing from the principles of the invention.

What is claimed is:

1. Apparatus comprising in combination, a platform; a housing mounted on said platform; a rotatable member within said housing that normally is subjected to unbalanced loads; mounting means fixed to a supporting floor; brackets at the four corners of said platform; hole means within each bracket aligned with hole means within another of said brackets; torsion bar arrangements having leg means of one arrangement passing through the aligned hole means of certain of said brackets and the leg means of another arrangement passing through the aligned hole means of certain other of said brackets; and arm means at the free ends of each leg means connected to one of said mounting means for supporting said platform at a desired distance from said floor, said torsion bar arrangements having a natural period of vibration substantially below the normal rotative speed of said rotatable member.

2. Apparatus comprising in combination, a platform; a housing mounted on said platform; a rotatable member within said housing that normally is subjected to unbalanced loads; mounting means fixed to a supporting floor; brackets at the four corners of said platform; hole means within each bracket aligned with hole means within another of said brackets; torsion bar arrangements having leg means of one arrangement passing through the aligned hole means of certain of said brackets and the leg means of another arrangement passing through the aligned hole means of certain other of said brackets; arm means at the free ends of each leg means connected to one of said mounting means for supporting said platform at a desired distance from said floor, said torsion bar arrangements having a natural period of vibration substantially below the normal rotative speed of said rotatable member; and shock absorber means between said housing and floor.

3. Apparatus comprising in combination, a platform; a housing mounted on said platform; a rotatable member within said housing that normally is subjected to unbalanced loads; mounting means fixed to a supporting floor; brackets at four corners of said platform; vertically spaced holes within each of said brackets aligned with vertically spaced holes within another of said brackets; U-shaped torsion bars arranged reversely with respect to each other, the legs of one of said arrangements passing through all of the aligned holes in one plane and the legs of the other arrangement passing through all of the holes in another plane; and arm means at the free ends of each leg connected to one of said mounting means.

4. Apparatus comprising in combination, a platform; a housing mounted on said platform; a rotatable member within said housing that normally is subjected to unbalanced loads; mounting means fixed to a supporting floor; brackets at four corners of said platform; vertically spaced holes within each of said brackets aligned with vertically spaced holes within another of said brackets; U-shaped torsion bars arranged reversely with respect to each other, the legs of one of said arrangements passing through all of the aligned holes in one plane and the legs of the other arrangement passing through all of the holes in another plane; arm means at the free ends of each leg connected to one of said mounting means; and shock absorber means between said housing and floor on opposite sides of the axis of rotation of said rotatable member.

5. Apparatus comprising in combination, a platform; a housing mounted on said platform; a rotatable member within said housing that normally is subjected to unbalanced loads; mounting means fixed to a supporting floor; brackets at the four corners of said platform; hole means within each bracket aligned with hole means within another of said brackets; torsion bar arrangements having leg means of one arrangement passing through the aligned hole means of certain of said brackets and the leg means of another arrangement passing through the aligned hole means of certain other of said brackets; arm means at the free ends of each leg means connected to one of said mounting means for supporting said platform at a desired distance from said floor, said torsion bar arrangements having a natural period of vibration substantially below the normal rotative speed of said rotatable member; and shock absorber means between each corner of said platform and said supporting floor.

6. Apparatus comprising in combination, a platform; a housing mounted on said platform; a rotatable member within said housing that normally is subjected to unbalanced loads; mounting means fixed to a supporting floor; brackets at the four corners of said platform; hole means within each bracket aligned with hole means within another of said brackets; torsion bar arrangements having leg means of one arrangement passing through the aligned hole means of certain of said brackets and the leg means of another arrangement passing through the aligned hole means of certain other of said brackets; arm means at the free ends of each leg means connected to one of said mounting means for supporting said platform at a desired distance from said floor, said torsion bar arrangement having a natural period of vibration substantially below the normal rotative speed of said rotatable member; double acting shock-absorbing means mounted at each corner of said platform, each including an oscillatable arm normally positioned substantially along a radial line relative to the axis of rotation of said rotatable member; and stationary means on said supporting floor for cooperating with said oscillatable arms.

7. Apparatus comprising in combination, a platform; a housing mounted on said platform; a rotatable member within said housing that normally is subjected to unbalanced loads; mounting means fixed to a supporting floor; brackets at the four corners of said platform; hole means within each bracket aligned with hole means within another of said brackets; torsion bar arrangements having leg means of one arrangement passing through the aligned hole means of certain of said brackets and the leg means of another arrangement passing through the aligned hole means of certain other of said brackets; arm means at the free ends of each leg means connected to one of said mounting means, said torsion bar arrangements having a natural period of vibration substantially below the normal rotative speed of said rotatable member; double acting shock-absorbing means mounted at each corner of said platform, each including an oscillatable arm normally positioned substantially along a radial line relative to the axis of rotation of said rotatable member; and stationary means on said supporting floor for cooperating with said oscillatable arms.

8. Apparatus comprising in combination, a platform; a housing mounted on said platform; a rotatable member within said housing that normally is subjected to unbalanced loads; mounting means fixed to a supporting floor; brackets at four corners of said platform; vertically spaced holes within each of said brackets aligned with vertically spaced holes within another of said brackets aligned with vertically spaced holes within another of said brackets; U-shaped torsion bars arranged reversely with respect to each other, the legs of one of said arrangements passing through all of the aligned holes in one plane and the legs of the other arrangement passing through all of the holes in another plane; arm means at the free ends of each leg connected to one of said mounting means; and shock absorber means between each corner of said platform and said supporting floor.

9. Apparatus comprising in combination, a platform; a housing mounted on said platform; a rotatable member within said housing that normally is subjected to unbalanced loads; mounting means fixed to a supporting floor; brackets at four corners of said platform; vertically spaced holes within each of said brackets aligned with vertically spaced holes within another of said brackets; U-shaped torsion bars arranged reversely with respect to each other, the legs of one of said arrangements passing through all of the aligned holes in one plane and the legs of the other arrangement passing through all of the holes in another plane; arm means at the free ends of each leg connected to one of said mounting means; double acting shock-absorbing means mounted at each corner of said platform, each including an oscillatable arm normally positioned substantially along a radial line relative to the axis of rotation of said rotatable member; and stationary means on said supporting floor for cooperating with said oscillatable arms.

References Cited in the file of this patent
UNITED STATES PATENTS

| | | |
|---|---|---|
| 2,148,937 | Gerb | Feb. 28, 1939 |
| 2,232,456 | Hewetson | Feb. 18, 1941 |
| 2,647,591 | Young | Aug. 4, 1953 |
| 2,665,007 | Hallander | Jan. 5, 1954 |

FOREIGN PATENTS

| | | |
|---|---|---|
| 123,618 | Australia | Feb. 17, 1947 |
| 1,185,228 | France | Feb. 9, 1959 |